US012475317B2

(12) United States Patent
Gomes et al.

(10) Patent No.: US 12,475,317 B2
(45) Date of Patent: *Nov. 18, 2025

(54) SYSTEM AND METHOD FOR QUERY AUTHORIZATION AND RESPONSE GENERATION USING MACHINE LEARNING

(71) Applicant: ADP, Inc., Roseland, NJ (US)

(72) Inventors: Guilherme Gomes, Porto Alegre (BR); Bruno Apel, Porto Alegre (BR); Jarismar Silva, Porto Alegre (BR); Vincent Kellers, Bloomfield, NJ (US); Roberto Rodrigues Dias, Porto Alegre (BR); Roberto Masiero, Basking Ridge, NJ (US); Roberto Silveira, Hoboken, NJ (US)

(73) Assignee: ADP, Inc., Roseland, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/447,273

(22) Filed: Aug. 9, 2023

(65) Prior Publication Data
US 2023/0385552 A1 Nov. 30, 2023

Related U.S. Application Data

(63) Continuation of application No. 18/068,736, filed on Dec. 20, 2022, now Pat. No. 11,748,569, which is a
(Continued)

(51) Int. Cl.
G06F 40/295 (2020.01)
G06F 18/24 (2023.01)
(Continued)

(52) U.S. Cl.
CPC ............ G06F 40/295 (2020.01); G06F 18/24 (2023.01); G06F 40/205 (2020.01); G06N 20/00 (2019.01); G10L 17/24 (2013.01)

(58) Field of Classification Search
CPC ...... G06F 40/295; G06F 18/24; G06F 40/205; G06F 40/211; G06N 20/00; G06N 3/045; G06N 7/01; G10L 17/24; G10L 15/26
See application file for complete search history.

(56) References Cited

U.S. PATENT DOCUMENTS 6,721,706 B1 * 4/2004 Strubbe ................. G10L 15/22
704/E15.04
6,882,441 B1 * 4/2005 Faust ..................... G06F 40/186
358/1.18
(Continued)

FOREIGN PATENT DOCUMENTS

WO WO-2019103738 A1 * 5/2019 ....... G06F 16/90332

OTHER PUBLICATIONS

W. J. Premerlani and M. R. Blaha, ("An approach for reverse engineering of relational databases," [1993] Proceedings Working Conference on Reverse Engineering, 1993, pp. 151-160, doi: 10.1109/WCRE.1993.287769.) (Year: 1993).*

(Continued)

Primary Examiner — Bhavesh M Mehta
Assistant Examiner — Philip H Lam
(74) Attorney, Agent, or Firm — Foley & Lardner LLP

(57) ABSTRACT

Systems, methods, and computer-readable storage media for responding to a query using a neural network and natural language processing. If necessary, the system can request disambiguation, then parse the query using a trained machine-learning classifier, resulting in at least one of an identified subject or an identified domain of the text query. The system can determine if the user is authorized to retrieve answers to the query and, if so, retrieve factual data associated with the query. The system can then retrieve a response template, and fill in the template with the retrieved facts. The system can then determine, by executing a machine comprehension model on the filled response tem-
(Continued)

plate, a probable readability token, portion of text, of at least a portion of the filled response template and, upon identifying that the probable readability is above a threshold, reply to the text query with the at least a portion of the filled response template.

17 Claims, 7 Drawing Sheets

Related U.S. Application Data continuation of application No. 16/864,931, filed on May 1, 2020, now Pat. No. 11,562,749.

(51) Int. Cl.
  *G06F 40/205* (2020.01)
  *G06N 20/00* (2019.01)
  *G10L 17/24* (2013.01)

(56) References Cited

U.S. PATENT DOCUMENTS

| | | | |
|---|---|---|---|
| 7,444,351 | B1 | 10/2008 | Nomiyama |
| 10,482,475 | B2* | 11/2019 | Douglas ................ G06Q 30/02 |
| 10,762,114 | B1 | 9/2020 | Annunziata et al. |
| 2004/0177052 | A1* | 9/2004 | Bridges ................ G06N 5/046 |
| | | | 706/45 |
| 2006/0010104 | A1 | 1/2006 | Pettinati et al. |
| 2006/0161531 | A1* | 7/2006 | Khandelwal ...... G06F 16/90335 |
| | | | 707/E17.14 |
| 2011/0161347 | A1 | 6/2011 | Johnston |
| 2011/0282890 | A1 | 11/2011 | Griffith |
| 2014/0006012 | A1 | 1/2014 | Zhou et al. |
| 2014/0040274 | A1 | 2/2014 | Aravamudan et al. |
| 2014/0171133 | A1* | 6/2014 | Stuttle .................... H04L 51/04 |
| | | | 455/466 |
| 2014/0282238 | A1* | 9/2014 | Dart ...................... G06F 3/0482 |
| | | | 715/810 |
| 2015/0324349 | A1* | 11/2015 | Weiss .................. G06F 16/3329 |
| | | | 704/9 |
| 2015/0370979 | A1* | 12/2015 | Boloor ................... G16H 15/00 |
| | | | 705/3 |
| 2016/0125750 | A1 | 5/2016 | Barker et al. |
| 2016/0283491 | A1* | 9/2016 | Lu ........................ G06F 16/3322 |
| 2016/0294748 | A1* | 10/2016 | Yang .................... G06Q 10/107 |
| 2017/0034177 | A1 | 2/2017 | Narasimhan et al. |
| 2017/0249307 | A1 | 8/2017 | Whitnah et al. |
| 2017/0262811 | A1* | 9/2017 | Ovadya ................. G06F 40/186 |
| 2018/0268300 | A1* | 9/2018 | Konopnicki ......... G06F 16/3329 |
| 2018/0357282 | A1* | 12/2018 | Ambartsumov .. G06F 16/90335 |
| 2019/0034982 | A1* | 1/2019 | Kulp .................. G06Q 30/0277 |
| 2019/0188410 | A1 | 6/2019 | Briscoe et al. |
| 2019/0214114 | A1* | 7/2019 | Schleyer ............... G06F 16/335 |
| 2019/0243979 | A1* | 8/2019 | De Gaetano .......... G06F 21/604 |
| 2019/0311064 | A1* | 10/2019 | Chakraborty ..... G06F 16/90332 |
| 2020/0012650 | A1* | 1/2020 | Fan ................... G06F 16/24578 |
| 2020/0142996 | A1* | 5/2020 | Kondadadi ......... G06F 16/3326 |
| 2020/0159798 | A1* | 5/2020 | Gustavson ............ G06F 16/957 |
| 2020/0213319 | A1* | 7/2020 | Bowie .................. H04L 63/108 |
| 2020/0327196 | A1* | 10/2020 | Sampat .................. G06N 20/00 |
| 2021/0081425 | A1 | 3/2021 | Wayne et al. |
| 2021/0081615 | A1* | 3/2021 | McRitchie .............. H04L 51/02 |
| 2021/0240776 | A1 | 8/2021 | Jawagal et al. |
| 2021/0294857 | A1* | 9/2021 | Aher ..................... G06F 40/247 |
| 2021/0312141 | A1* | 10/2021 | Shi .......................... G06F 40/47 |

OTHER PUBLICATIONS

International Preliminary Report on Patentability issued in corresponding International Application No. PCT/US2021/029625 dated Nov. 10, 2022 (7 pages).
International Search Report and Written Opinion issued in corresponding International Application No. PCT/US2021/029625 dated Jul. 22, 2021 (9 pages).
Lapalme, G., & Kosseim, L. (2003). Mercure: Towards an automatic e-mail follow-up system. IEEE Computational Intelligence Bulletin, 2(1), 14-18. (Year: 2003).
U.S. Notice of Allowance issued in corresponding U.S. Appl. No. 16/864,931, dated Sep. 20, 2022 (13 pages).
U.S. Notice of Allowance on U.S. Appl. No. 18/068,736 dated Apr. 26, 2023 (13 pages).
U.S. Non-Final Office Action issued in corresponding U.S. Appl. No. 16/864,931, dated May 25, 2022 (40 pages).
Extended European Search Report issued in corresponding EP Application No. 21797366.8, dated Apr. 4, 2024 (10 pages).

* cited by examiner

What is Chandar phone?

Here's the phone information you requested for Chandar Subbaian:

Personal Phone Number
+19737798483

Business Mobile Number
+19733412325

Business Landline Number
+19733876487

FIG. 9

What is Chandar email?

Here's the email information you requested for Chandar Subbaian:

Business email
Chandar.Subbaian@ADPDonut.com

Personal email
chandar.subbaian@adp.com

FIG. 10

SYSTEM AND METHOD FOR QUERY AUTHORIZATION AND RESPONSE GENERATION USING MACHINE LEARNING

CROSS-REFERENCE TO RELATED APPLICATIONS

This application is a continuation of U.S. patent application Ser. No. 16/864,931, filed on May 1, 2020, the content of which is hereby incorporated by reference in its entirety.

BACKGROUND

1. Technical Field

The present disclosure relates to automatic query authorization and response generation, and more specifically to determining if a user making a query is authorized to receive a response to the query, using natural language processing to parse the query, and using machine learning to identify the probabilities that data collected in response to the query is correct.

2. Introduction

Natural language processing algorithms are used by computer systems to parse and interpret text. For example, natural language processing algorithms can receive text obtained from a speech-to-text conversion, parse the text into parts of speech such as adjectives, nouns, and verbs, then identify based on those adjectives, nouns, and verbs the objective of the text. As natural language processing tools become more commonly deployed, users trust in the results of those natural language processing tools increases.

However, when a query is made which has privacy requirements, security requirements, and/or other restrictions, the results of the natural language processing need to be sufficiently flexible and scalable to provide a satisfactory answer or response. Moreover, there is an expectation that chatbots and other query systems relying on natural language processing have very short response times (e.g., "real time"). One exemplary technical problem which exists with real time natural language processing of queries on restricted content is how to efficiently authorize retrieval of query information without delaying the results being provided without imposing performance restraints on the processors and other computer components generating the response. This problem can be compounded by an inability to store private or secure data in ways which could compromise the integrity of the data (meaning that the data cannot be stored within intermediate, more efficient databases).

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Aspects of the disclosure include a system and method comprising identifying, at a processor, an identity of a user; receiving a text query of the user; identifying, via the processor executing a classifier, at least one named entity within the text query; retrieving, via the processor from a personnel database, a plurality of identities associated with the at least one named entity; receiving, from the user, a disambiguation input identifying a selected entity from the plurality of identities; parsing, via the processor executing a trained machine-learning classifier, the text query, resulting in at least one of an identified subject or an identified domain of the text query; authorizing the user, via the processor and based on the identity of the user and the at least one of the identified subject or the identified domain, to access a restricted database containing restricted data associated with the at least one of the identified subject or the identified domain; retrieving, via the processor, a response template specific to the at least one of the identified subject or the identified domain; filling, via the processor accessing the restricted database, the response template with at least a portion of the restricted data associated with the at least one of the identified subject or the identified domain, resulting in a filled response template; determining, via the processor executing a machine comprehension model on the filled response template, a probable readability token of at least a portion of the filled response template; and upon identifying that the probable readability is above a threshold, replying to the text query with the at least a portion of the filled response template.

In another aspect, the classifier is a neural network is pretrained to identify proper nouns within the text query.

In another aspect, the trained machine-learning classifier iteratively modifies code executed by the processor upon receiving a threshold number of text queries.

In another aspect, the trained machine-learning classifier uses logistic regression between iterations to identify which aspects of the code to modify.

In another aspect, the response template includes an identifier associated with the portion of the restricted data, and further comprising matching the identifier with a key database to retrieve data corresponding to the identifier and filling the response template with the data.

In another aspect, removing portions of the filled response template which are not associated with the at least one of the identified subject or the identified domain, resulting in the at least a portion of the filled response template.

In another aspect, the text query of the user is received as a speech query; and converted, by the processor executing a speech-to-text conversion, the speech query into the text query.

In another aspect, the at least one named entity within the text query comprises at least one of a legal formatted name, a given name, a family name, and a nickname.

BRIEF DESCRIPTION OF THE DRAWINGS

FIG. 9 illustrates an example of a query response containing a phone number; and FIG. 10 illustrates an example of a query response containing an email address.

DETAILED DESCRIPTION

Figure 1:
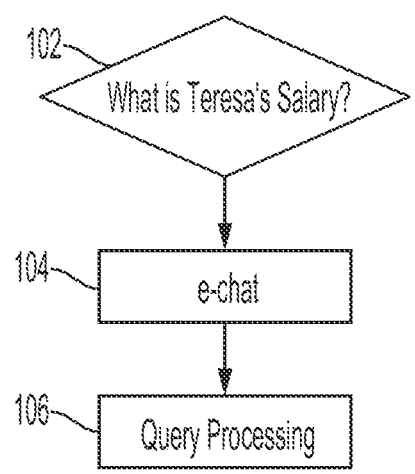
FIG. 1 illustrates an example of query entry.

Various embodiments of the disclosure are described in detail below. While specific implementations are described, it should be understood that this is done for illustration purposes only. Other components and configurations may be used without parting from the spirit and scope of the disclosure.

One exemplary, non-limiting, solution to the technical problem noted above is, upon receiving authorization for a user to receive the queried information, to implement a machine learning algorithm to complete a response template with restricted data associated with the query. Parsing the query into speech components (e.g., nouns, verbs, adverbs, adjectives, etc.) can occur using a natural language processing algorithm. The speech components can then be processed using a trained machine-learning classifier, which can identify the subject and/or domain of the query. In some examples, the trained machine-learning classifier may be logistic regression, naïve bayes, multi-layer perceptron, neural network, etc. Based on the subject and/or domain, the system can determine what database(s) contains the information being requested. The system can then determine if the requestor requesting the respective information has authorization to access the identified database. If there is authorization, the system can obtain the restricted data from the restricted database, then use a response template to generate an assertion response. Finally, the system can execute a comprehension model/algorithm on the generated assertion response, ensuring that the response generated will provide the comprehendible information. If the comprehension model provides a score above a pre-determined threshold, the generated response is provided to the requestor.

Consider the following example involving a chatbot. A chatbot is a window within a computer operating system or webpage which provides a conversation using auditory or textual methods. While the chatbot gives the appearance that another user is providing answers to the user's queries, in reality there may be a computer generating the responses. In this example, a user is an employee of an organization, and wants to determine the phone number for another employee of the organization. The user has already logged into the employer's network, and therefore has a user identification (user ID) already established before generating a query.

The user enters a textual query of "What is Sally's phone number?" into the chatbot. The chatbot receives the query and executes natural language processing on the text. The natural language processing identifies "Sally" as a named entity, and the system compares "Sally" to known names within a personnel database. This comparison to known names can occur, by example, through a trained neural network which identifies potential individuals matching the query using each subsequent letter in an iterative fashion. For example, there could be five hundred individuals within the organization whose names start with "S," three hundred with "Sa," but only two with the entirety of "Sally." In some examples, the neural network can use several features in order to characterize a name. For example, features such as a word starting with Upper case, includes a particular combination of letters, etc. may be used. The deep nets may basically "learn" which features may be important for tagging based on the dataset provided, for example, depending on the examples that exist on the database—Latin names, European names, etc.

In this case, the system has identified multiple individuals named "Sally" and presents a disambiguation question to the user, such as "Do you mean Sally X or Sally Y?" The user provides a disambiguation input to the system ("I mean Sally X"), and the system, using a trained machine-learning classifier, uses the remainder of the parsed query with the disambiguation input to determine an identified subject, domain, or context of the query. In one example, a sample dataset with example phrases for each domain (e.g. What is my salary? (PAYROLL) What is my compensation (PAYROLL)? What is my e-mail (GENERAL)? What is my medical plan (BENEFITS)?) may be provided. The neural network may basically learn the distribution of the tokens for each domain, and then may provide the probability of a new phrase to be part of each domain distribution For example, the machine-learning classifier can be based on logistic regression with TF-IDF (term frequency-inverse document frequency) features, or multi-layer perceptron. Based on the identified subject/domain/context, the system can identify one or more databases which contain information for identified subject/domain/context. The system can then determine if the user ID of the user is authorized to access the respective database.

Authorization to retrieve the restricted data, or otherwise access the restricted database can be obtained, for example, by using the user ID, then comparing that ID to a list of authorized users. In some configurations, additional points of verification/authorization may be required to confirm the identity of the user, such as passwords, user names, biometric (including, but not limited to fingerprint, retinal, voice, and facial recognition), etc. In one exemplary use case, GraphQL is used to retrieve user information. Once the user information is retrieved. an API may provide an entitlement/authentication service based on user role (that is defined in a database).

Upon retrieving the data from the restricted database, the system can use that data to complete, or otherwise fill in, a previously-generated response template. The response template can be selected based on the context or domain of the query. Templates may be proposed based on anticipated inquiries. Templates with assertions may be provided for each domain. The templates may be pre-defined based on the specific implementation, such as the information need for the application. For example, all queries for a phone number can use a first common template, and all queries for addresses can use a second common template. In this case, the system obtains Sally's phone number from the database and enters that number into the template.

Another exemplary embodiment provides additional flexibility in terms of input components to be used. In this example, when the assertions are built a GUID (global unique identifier) is included as the response to the assertion. An example follows:

Template

"I am Roberto Silveira.
Roberto Silveira email information is 35df4764.
Roberto Silveira's phone contact information is 3289eb54.
Roberto Silveira's work business address information is ef2454aa.
Roberto Silveira's home address is 5c8fb035. "

Dictionary with Keys

```
{
  "3289eb54": {
    "entitlement": true,
    "input_component": "PlainTextMessage",
    "key_values": {
      "Business Landline Number": "+2312312",
      "Business Mobile Number": "+2312312",
      "Personal Phone Number": "+231231231"
    },
    "text": "Here's the phone information you requested for Roberto Silveira:"
  },
  "35df4764": {
    "entitlement": true,
    "input_component": "PlainTextMessage",
    "key_values": {
      "Business email": "roberto.silveira@adp.com",
      "Personal email": "rsilveira79@gmail.com"
    },
    "text": "Here's the email information you requested for Roberto Silveira:"
  },
  "5c8fb035": {
    "entitlement": true,
    "input_component": "AddressDisplay",
    "text": "Rua Marques do Pombal 55/33"
  },
  "ef2454aa": {
    "entitlement": true,
    "input_component": "AddressDisplay",
    "text": "Rua Soledade 550, ADP"
  }
}
```

This GUID (e.g. 35df4764) may be used as a key to a separate object, that contains a reply to this question and also some other contextual information (such as type of controller to be used, entitlement for this specific assertion, external links, internationalization information, and so on).

This new construct can allow complex answers to be built, as shown in FIGS. 9 and 10. In some cases, this can be an additional method of building the assertion, with the initial method to include the string itself, e.g. "Chandar phone number is +19737798483".

In some configurations, prior to sending the completed template to the user as a response, the system can then execute a comprehension model/analysis on the completed template. The comprehension model/analysis reviews the proposed response, scores it for comprehension and usability, and generates a probability of each token in the assertion template to be part of the response (comprehension score). Only if the comprehension score is above a threshold amount does the system send the completed template to the user as a response. Thus, embodiments ensure a computer system can provide a response that is comprehensible to people. If the comprehension score is not above the threshold amount, the system can retrieve another template and complete it with the retrieved data, attempt to correct the errors found in the current completed template, and/or inform the user that the data retrieved cannot be presented due to formatting issues. As an example of correcting a completed template, the response to the query for Sally's phone number may result in "Sally's phone number is 555-5555." However, the user making the query is in the United Kingdom, and needs international and area dialing codes. The system can then correct the response to the query to read "Sally's phone number is 01-555-555-5555." In this manner, the location and/or other characteristics (age, demographic, language, country, etc.) of the user generating the query can be used when determining if the query response is comprehensible.

Queries can be generated using text (such as the chatbot described above) and/or speech which is then converted to text using speech-to-text processing algorithms. Such speech-to-text algorithms may be executed on one or more processors specifically configured to receive audio data and convert it to text. These processors may or may not be the same processors which then perform natural language processing on the resulting text of the query.

Identifying names, or proper nouns, within the query can occur using conditional random fields (CRF); neural networks, such as named entity recognition (NER), using pretrained language models such as BERT (Bidirectional Encoder Representations from Transformers). In order to improve the accuracy of the language models being used, and allow for better detection when users present their query using all lowercase letters, the model can be fined tuned to include all the entities (legal formatted name, given name, family name, nicknames) that are provided by the client database. In addition, the system can detect if the question was related to a self-entity (e.g., "my," "myself," "mine; for example, "What is my corporate email?), and then pass this information on to the next steps.

The machine comprehension model receives the query (preferably with the named entities components identified) and facts obtained from the restricted database, then provides as output probabilities regarding which facts provided to the model are most probable to be part of the answer to the query. In some configurations, these probabilities can be associated with tokens associated with the respective facts. In addition, the output of the model can remove special formatting associated with the inputs, such as #a# for address, #p# for phone, #u# for unauthorized, etc., and provide the output with proper formatting for the user interface.

In exemplary embodiments, a category of models that is named "machine comprehension" may be used. Both question and facts are converted to a vector space (embeddings) and then a mechanism of attention from the question to the facts is used to predict the probability (logits) of each token to be part of the reply. The primary dataset to train these category of models may be SQuAD (1.0 and 2.0—more details here https://rajpurkar.github.io/SQuAD-explorer/). Other datasets may also be used depending on implementation details (e.g. NewsQA, SWAG)—more details here: http://nlpprogress.com/english/question_answering.html The description now turns to the figures for additional examples and explanation.

FIG. 1 illustrates an example of query entry. As illustrated, FIG. 1 illustrates how the message 102 arrives. In this example, the user is interacting with an e-chat 104, such as the chatbot described above. The e-chat 104 is able to detect user "intent," or commands that the user is asking the system to make. One exemplary command or intent is "question-.detect," and in such instances the system determines that the user is intending to ask a question to the system (rather than executing other business through the chat window). Once the query 102 in the e-chat 104, it is forwarded to query processing 106. Also at this stage, the system can collect information about the user that is using the chat window. For example, user identification can be collected (if not previously obtained). In some configurations, the system can generate an authorization token, which will be combined with the message and passed onto additional portions of the query response system. The token can, for example, contain the user ID as well as information about the respective authorizations that the user associated with the user ID has. The token may be just one ID of the user. The token may be used by the authorization/entitlement API to check if this user will be able to access a given piece of information.

Figure 2:
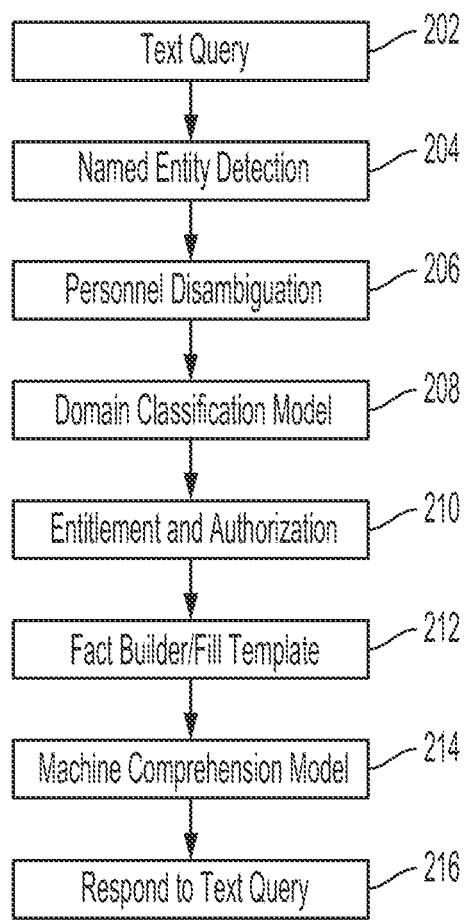
FIG. 2 illustrates an example algorithm for responding to a text query.

FIG. 2 illustrates an example algorithm for responding to a text query. As illustrated, the query 202 is received, and named entity detection 204 occurs on the query. The named entity detection can include, for example, natural language processing to identify for each word in the query its corresponding type of speech component (that is, the system parses the query). If necessary, the system can perform a personnel disambiguation 206. For example, if multiple individuals with a same name are present, the system can request that the user identify which individual is meant. Likewise, if there are other proper nouns within the query, which are not directed to people, the system may require disambiguation for those other proper nouns as well.

The system then uses a domain classification model 208 on the parsed, disambiguated speech to identify the domain and/or context of the query. Once the domain/context is determined, the system determines if the user which originated the query 202 is authorized and entitled 210 to receive the answer to the query. If so, the system retrieves facts associated with the query and fills in a response template 212 using those retrieved facts. The completed template is then analyzed by a machine comprehension model 214 and, if the prepared response meets a minimum level (threshold) of readability, the response is sent to the user as a response to the text query 216.

Figure 3:
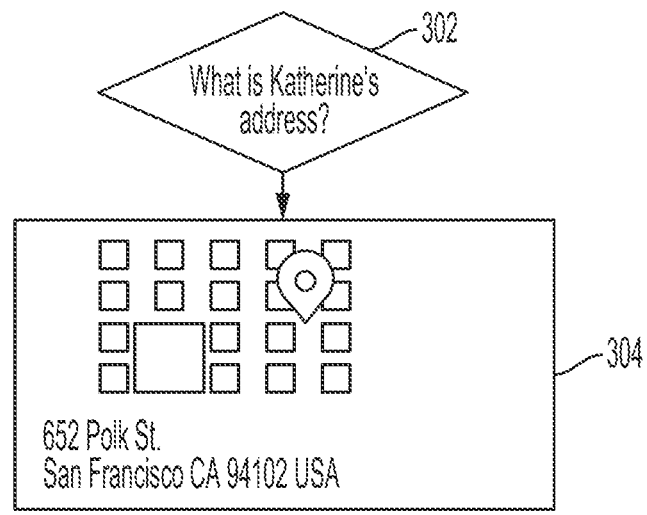
FIG. 3 illustrates an example of a query response containing a map.
Figure 4:
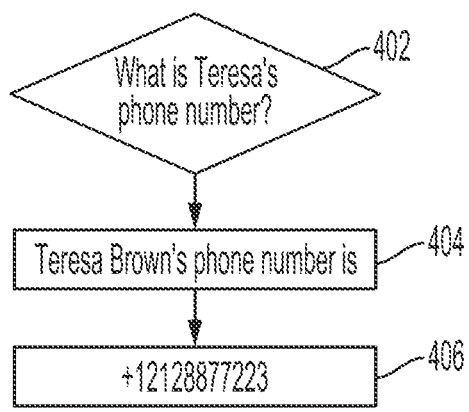
FIG. 4 illustrates an example of a query response containing a phone number.

FIG. 3 illustrates an example of a query response containing a map. Because the query 302 illustrated is requesting an address, the system can prepare a response 304 which contains both the address requested as well as a map of the address. In some configurations, the map can be generated by the system, whereas in other configurations the map can be generated by a third party (such as GOOGLE MAPS), and the system can forward the map generated by the third party as part of the response FIG. 4 illustrates an example of a query response containing a phone number. In this example, the query 402 is requesting a phone number. The system can respond with a response which contains two portions: a first (template) portion 404 which includes text prepared in response to the query, and a second portion 406 which is the telephone number. In some configurations, as the user clicks on the telephone number within the second portion 406 of the response, the system can cause a phone call to be initiated to the displayed phone number.

Figure 5:
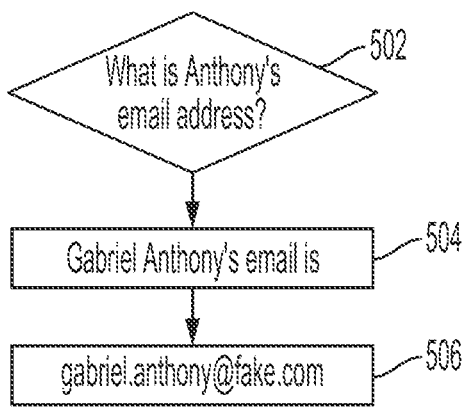
FIG. 5 illustrates an example of a query response containing an email address.

FIG. 5 illustrates an example of a query response containing an email address. In this example, the query 502 requests an email address, and the response has two portions: a first (template) portion 504 setting up the response, and a second portion 506 containing the email address requested. In some configurations, as the user clicks on the email address within the second portion 506, the system can initiate an email from the computer system.

Figure 6:
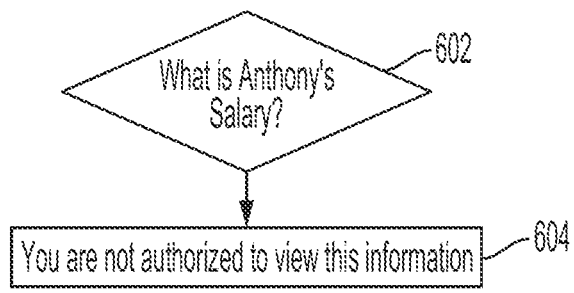
FIG. 6 illustrates an example of a query response when a user is not authorized to receive the answer.

FIG. 6 illustrates an example of a query response when a user is not authorized to receive the answer. As illustrated, the user generates a query 602, however in this case the user is requesting someone else's salary, which may have privacy or other restrictions in place. The system can check to see if the user generating the query is authorized and, upon determining that the user is not authorized, generate a response 604 indicating that the user lacks that authorization.

Figure 7:
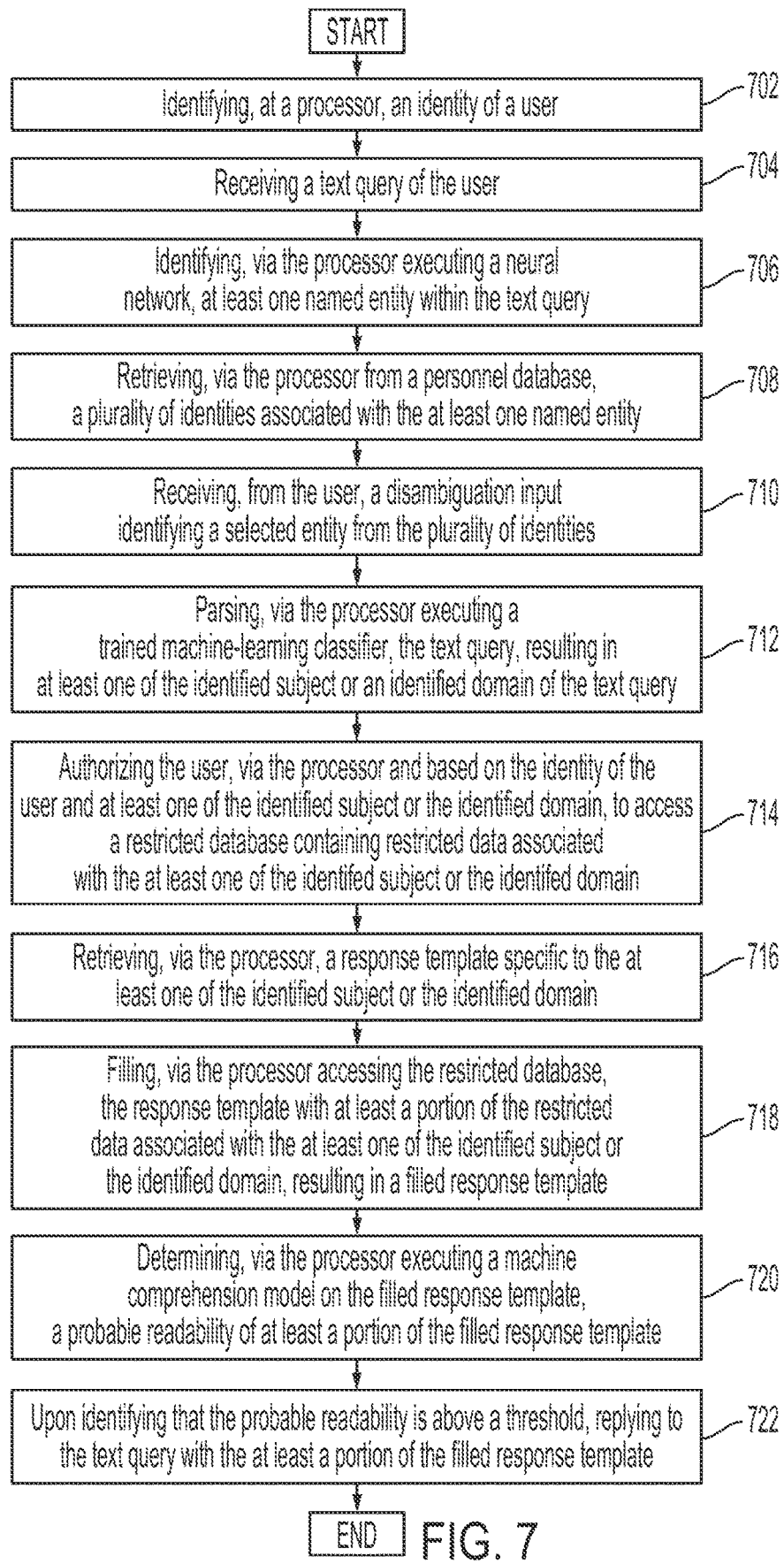
FIG. 7 illustrates an example method embodiment.

FIG. 7 illustrates an example method embodiment. As illustrated, the system can identify, at a processor, an identity of a user (702) and receive a text query from the user (704). In some cases, the text query can be a spoken query which is converted to text by a speech-to-text algorithm. The system can then identify, via the processor executing a neural network, at least one named entity within the text query (706). The system can then retrieve, via the processor from a personnel database, a plurality of identities associated with the at least one named entity (708), and (if needed), receive from the user, a disambiguation input identifying a selected entity from the plurality of identities (710). The system can then parse, via the processor executing a trained machine-learning classifier, the text query, resulting in at least one of an identified subject or an identified domain of the text query (712).

The system can authorize the user, via the processor and based on the identity of the user and the at least one of the identified subject or the identified domain, to access a restricted database containing restricted data associated with the at least one of the identified subject or the identified domain (714) and, with that authorization, retrieve, via the processor, a response template specific to the at least one of the identified subject or the identified domain (716). The system can then fill, via the processor accessing the restricted database, the response template with at least a portion of the restricted data associated with the at least one of the identified subject or the identified domain, resulting in a filled response template (718). Next, the system can determine, via the processor executing a machine comprehension model on the filled response template, a probable readability of at least a portion of the filled response template (720) and, upon identifying that the probable readability is above a threshold, replying to the text query with the at least a portion of the filled response template (722).

In some configurations, the neural network can be pre-trained to identify proper nouns within the text query.

In some configurations, the trained machine-learning classifier can iteratively modify code executed by the processor upon receiving a threshold number of text queries. In such configurations, the trained machine-learning classifier can use logistic regression between iterations to identify which aspects of the code to modify.

In some configurations, the illustrated method can be augmented to further include: removing portions of the filled response template which are not associated with the at least one of the identified subject or the identified domain, resulting in the at least a portion of the filled response template.

In some configurations, the text query of the user can be received as a speech query and converted, by the processor executing a speech-to-text conversion, the speech query into the text query.

In some configurations, the at least one named entity within the text query can include at least one of a legal formatted name, a given name, a family name, and a nickname.

Figure 8:
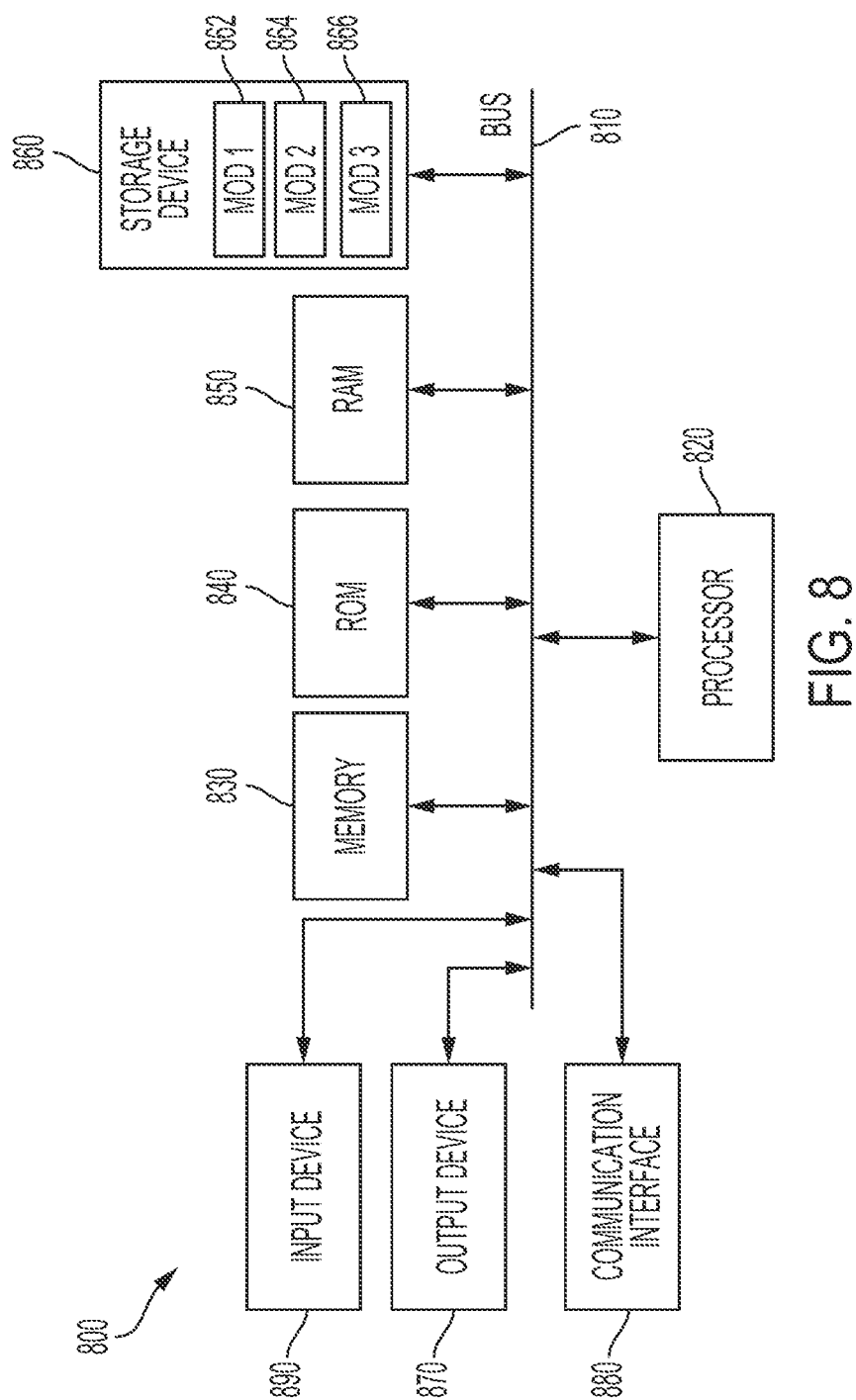
FIG. 8 illustrates an example computer system.

With reference to FIG. 8, an exemplary system includes a general-purpose computing device 800, including a processing unit (CPU or processor) 820 and a system bus 810 that couples various system components including the system memory 830 such as read-only memory (ROM) 840 and random access memory (RAM) 850 to the processor 820. The system 800 can include a cache of high-speed memory connected directly with, in close proximity to, or integrated as part of the processor 820. The system 800 copies data from the memory 830 and/or the storage device 860 to the cache for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer-readable storage media provide nonvolatile storage of computer-readable instructions, data structures, program modules and other data for the computing device 800. In one aspect, a hardware module that performs a particular function includes the software component stored in a tangible computer-readable storage medium in connection with the necessary hardware components, such as the processor 820, bus 810, display 870, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 800 is a small, handheld computing device, a desktop computer, or a computer server.

Although the exemplary embodiment described herein employs the hard disk 860, other types of computer-readable media which can store data that are accessible by a computer, such as magnetic cassettes, flash memory cards, digital versatile disks, cartridges, random access memories (RAMs) 850, and read-only memory (ROM) 840, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

The invention claimed is:

1. A method comprising:
   establishing, by one or more processors, an interface for a chatbot;
   receiving, by the one or more processors via the interface for the chatbot, a query from a computing device;
   parsing, via the one or more processors executing a trained machine-learning classifier, the query to determine a subject of the query;
   selecting, by the one or more processors, based on the subject of the query, a response template from a plurality of response templates stored in a data repository, wherein the response template is selected to provide a response to the query;
   filling, via the one or more processors accessing a restricted database, the response template by matching an identifier included in the response template with a key to the restricted database to retrieve at least a portion of restricted data from the restricted database associated with the subject, resulting in a filled response template, wherein the identifier is associated with the at least the portion of the restricted data;
   removing, via the one or more processors, one or more portions of the filled response template that are not associated with the subject, resulting in a partially filled response template;
   determining, via the one or more processors, based on execution of a comprehension model on the partially filled response template, that a probability associated with the partially filled response template satisfies a threshold; and
   providing, via the one or more processors, responsive to the probability associated with the partially filled response template satisfying the threshold, the partially filled response template via the interface of the chatbot.

2. The method of claim 1, wherein the trained machine-learning classifier iteratively modifies code executed by the one or more processors upon receiving a threshold number of queries.

3. The method of claim 2, wherein the trained machine-learning classifier uses logistic regression between iterations to identify which aspects of the code to modify.

4. The method of claim 1, wherein the query is:
received as a speech query; and
converted, by the one or more processors executing a speech-to-text conversion, the speech query into the query.

5. The method of claim 1, wherein an identity associated with the computing device identifies at least one of a job title and a clearance level.

6. The method of claim 1, wherein the restricted data comprises salary information of other individuals.

7. A system comprising:
one or more processors; and
a computer-readable storage medium having instructions stored which, when executed by the one or more processors, cause the one or more processors to:
establish an interface for a chatbot;
receive, via the interface for the chatbot, a query from a computing device;
parse, based on execution of a trained machine-learning classifier, the query to determine a subject of the query;
select, based on the subject of the query, a response template from a plurality of response templates stored in a data repository, wherein the response template is selected to provide a response to the query;
fill, based on access to a restricted database, the response template by matching an identifier included in the response template with a key to the restricted database to retrieve at least a portion of restricted data from the restricted database associated with the subject, resulting in a filled response template, wherein the identifier is associated with the at least the portion of the restricted data;
remove one or more portions of the filled response template that are not associated with the subject, resulting in a partially filled response template;
determine, based on execution of a comprehension model on the partially filled response template, that a probability associated with the partially filled response template satisfies a threshold; and
provide, responsive to the probability associated with the partially filled response template satisfying the threshold, the partially filled response template via the interface of the chatbot.

8. The system of claim 7, wherein the trained machine-learning classifier iteratively modifies code executed by the one or more processors upon receiving a threshold number of queries.

9. The system of claim 8, wherein the trained machine-learning classifier uses logistic regression between iterations to identify which aspects of the code to modify.

10. The system of claim 7, wherein the query is:
received as a speech query; and
converted, by the one or more processors based on execution of a speech-to-text conversion, the speech query into the query.

11. The system of claim 7, wherein an identity associated with the computing device identifies at least one of a job title and a clearance level.

12. The system of claim 7, wherein the restricted data comprises salary information of other individuals.

13. A non-transitory computer-readable storage medium having instructions stored which, when executed by at least one processor, cause the at least one processor to perform operations comprising:
establishing an interface for a chatbot;
receiving, via the interface for the chatbot, a query from a computing device;
parsing, by executing a trained machine-learning classifier, the query to determine a subject of the query;
selecting, based on the subject of the query, a response template from a plurality of response templates stored in a data repository, wherein the response template is selected to provide a response to the query;
filling, by accessing a restricted database, the response template by matching an identifier included in the response template with a key to the restricted database to retrieve at least a portion of restricted data from the restricted database associated with the subject, resulting in a filled response template, wherein the identifier is associated with the at least the portion of the restricted data;
removing one or more portions of the filled response template that are not associated with the subject, resulting in a partially filled response template;
determining, based on execution of a comprehension model on the partially filled response template, that a probability associated with the partially filled response template satisfies a threshold; and
providing, responsive to the probability associated with the partially filled response template satisfying the threshold, the partially filled response template via the interface of the chatbot.

14. The non-transitory computer-readable storage medium of claim 13, wherein the trained machine-learning classifier iteratively modifies code executed by the at least one processor upon receiving a threshold number of queries.

15. The non-transitory computer-readable storage medium of claim 14, wherein the trained machine-learning classifier uses logistic regression between iterations to identify which aspects of the code to modify.

16. The non-transitory computer-readable storage medium of claim 13, wherein the query is:
received as a speech query; and
converted, by executing a speech-to-text conversion, the speech query into the query.

17. The non-transitory computer-readable storage medium of claim 13, wherein an identity associated with the computing device identifies at least one of a job title and a clearance level.

* * * * *